(12) United States Patent
Mitchell

(10) Patent No.: US 8,831,601 B2
(45) Date of Patent: Sep. 9, 2014

(54) TERRESTRIAL COMMUNICATIONS NETWORK SUITABLE FOR PROVIDING AIR-TO-GROUND CONNECTIVITY

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 153 days.

(21) Appl. No.: 13/539,638

(22) Filed: Jul. 2, 2012

(65) Prior Publication Data

US 2014/0004853 A1 Jan. 2, 2014

(51) Int. Cl.
*H04W 4/00* (2009.01)
(52) U.S. Cl.
USPC ......... 455/431; 455/422.1; 455/429; 455/447
(58) Field of Classification Search
CPC .... H04W 84/06; H04W 84/005; H04W 16/28
USPC .................................. 455/431, 422, 429, 447
See application file for complete search history.

(56) References Cited

U.S. PATENT DOCUMENTS

| | | | |
|---|---|---|---|
| 6,108,539 A * | 8/2000 | Ray et al. ...................... | 455/430 |
| 7,801,521 B2 | 9/2010 | Dent | |
| 7,920,860 B2 | 4/2011 | Chari et al. | |
| 2002/0197990 A1 | 12/2002 | Jochim et al. | |
| 2004/0095907 A1 | 5/2004 | Agee et al. | |
| 2006/0194576 A1 | 8/2006 | Karabinis et al. | |
| 2013/0182685 A1 * | 7/2013 | Yu et al. ........................ | 370/336 |

* cited by examiner

*Primary Examiner* — Vladimir Magloire
(74) *Attorney, Agent, or Firm* — Donna P. Suchy; Daniel M. Barbieri

(57) ABSTRACT

The present invention includes a plurality of native cellular nodes configured to provide wireless connectivity to one or more ground-based wireless devices, each native node including a BTS having a transceiver configured to transmit a downlink signal to the ground-based devices at a native downlink frequency and receive an uplink signal from the ground-based devices at a native uplink frequency, a plurality of augmented nodes configured to provide connectivity to one or more airborne devices, each augmented node including an augmented BTS having a transceiver configured to transmit a downlink signal to the one or more airborne communications devices via an upwardly directed antenna at the native downlink frequency and receive an air-to-ground uplink signal from the airborne devices at a selected air-to-ground uplink frequency different from the native uplink signal frequency, wherein the native nodes and the augmented nodes are configured to operate on a common backhaul infrastructure.

22 Claims, 5 Drawing Sheets

TERRESTRIAL COMMUNICATIONS NETWORK SUITABLE FOR PROVIDING AIR-TO-GROUND CONNECTIVITY

TECHNICAL FIELD

The present invention generally relates to communication networks, and more particularly to a system and method capable of providing air-to-ground connectivity on terrestrial communications networks.

BACKGROUND

Due to the ubiquity and low cost of implementation of terrestrial cellular networks and the increased demand in airborne data and voice access, it is desirable to provide aircraft with connectivity to existing terrestrial-based cellular networks. Currently available ground-based cellular network technologies include code division multiple access (CDMA), global system for mobile (GSM), universal mobile telecommunications system (UMTS), and long term evolution (LTE). Providing aircraft with connectivity to ground-based cellular networks poses a number of unique challenges. Due to the large line-of-sight of an airborne aircraft, radio frequency transmission patterns from an aircraft radio may cover a much larger geographical area than a similarly powered ground-based radio. In addition, the large extent of an airborne transmission pattern increases the likelihood of interference between airborne users and ground-based users. Current techniques are deficient in allowing an aircraft to connect to a single cellular node of a ground-based network, which is required for proper data handling and handoff within the cellular network. In addition, current approaches at reducing interference between airborne users and ground-based users have proven inadequate. As such, it would be desirable to provide a method and system, which cures the deficiencies identified in the prior art.

SUMMARY

A terrestrial communications network suitable for providing air-to-ground connectivity is disclosed. In one aspect, the network may include, but is not limited to, a plurality of native cellular nodes configured to provide wireless communication connectivity to one or more ground-based wireless communication devices, each native cellular node including a base transceiver station (BTS) having one or more transceivers configured to transmit a downlink signal to the one or more ground-based wireless communication devices at a native downlink frequency and receive an uplink signal from the one or more ground-based wireless communications devices at a native uplink frequency; and a plurality of augmented cellular nodes configured to provide wireless communication connectivity to one or more airborne communications devices, each augmented cellular node including an augmented BTS having one or more transceivers configured to transmit a downlink signal to the one or more airborne communications devices via one or more upwardly directed antennas at the native downlink frequency and receive an air-to-ground uplink signal from the one or more airborne communications devices at a selected air-to-ground uplink frequency, wherein the plurality of native cellular nodes and the plurality of augmented cellular nodes are configured to operate on a common backhaul infrastructure.

In another aspect, a wireless network communication node suitable for integration in a wireless communications network may include, but is not limited to, an augmented base transceiver station (BTS), the augmented BTS including one or more transceivers; one or more upwardly oriented antennas communicatively coupled to the one or more transceivers, the one or more transceivers configured to transmit a downlink signal to one or more airborne communication devices via the one or more upwardly oriented antennas; and one or more power amplifiers configured to amplify the downlink signal such that the downlink signal emanating from the one or more upwardly oriented antennas has a selected power level at least larger than a minimum threshold of a receiver of an airborne communications device, the one or more transceivers further configured to receive an uplink signal from the one or more airborne communications devices via the one or more upwardly oriented antenna, the uplink signal having a selected air-to-ground frequency.

A method for providing air-to-ground connectivity on a terrestrial wireless communications network is disclosed. In one aspect, the method may include, but is not limited to, transmitting one or more native downlink signals to one or more ground-based wireless communication devices at a native downlink frequency; receiving one or more uplink signals from the one or more ground-based wireless communications devices at a native uplink frequency; transmitting one or more air-to-ground downlink signals to one or more airborne communications devices via one or more upwardly directed antennas at the native downlink frequency; amplifying the one or more air-to-ground downlink signals such that the one or more air-to-ground downlink signals have a selected power level at least larger than a minimum threshold of a receiver of an airborne communications device; and receiving one or more uplink signals from the one or more airborne communications devices at a selected air-to-ground uplink frequency different from the native uplink frequency.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Figure 1A:
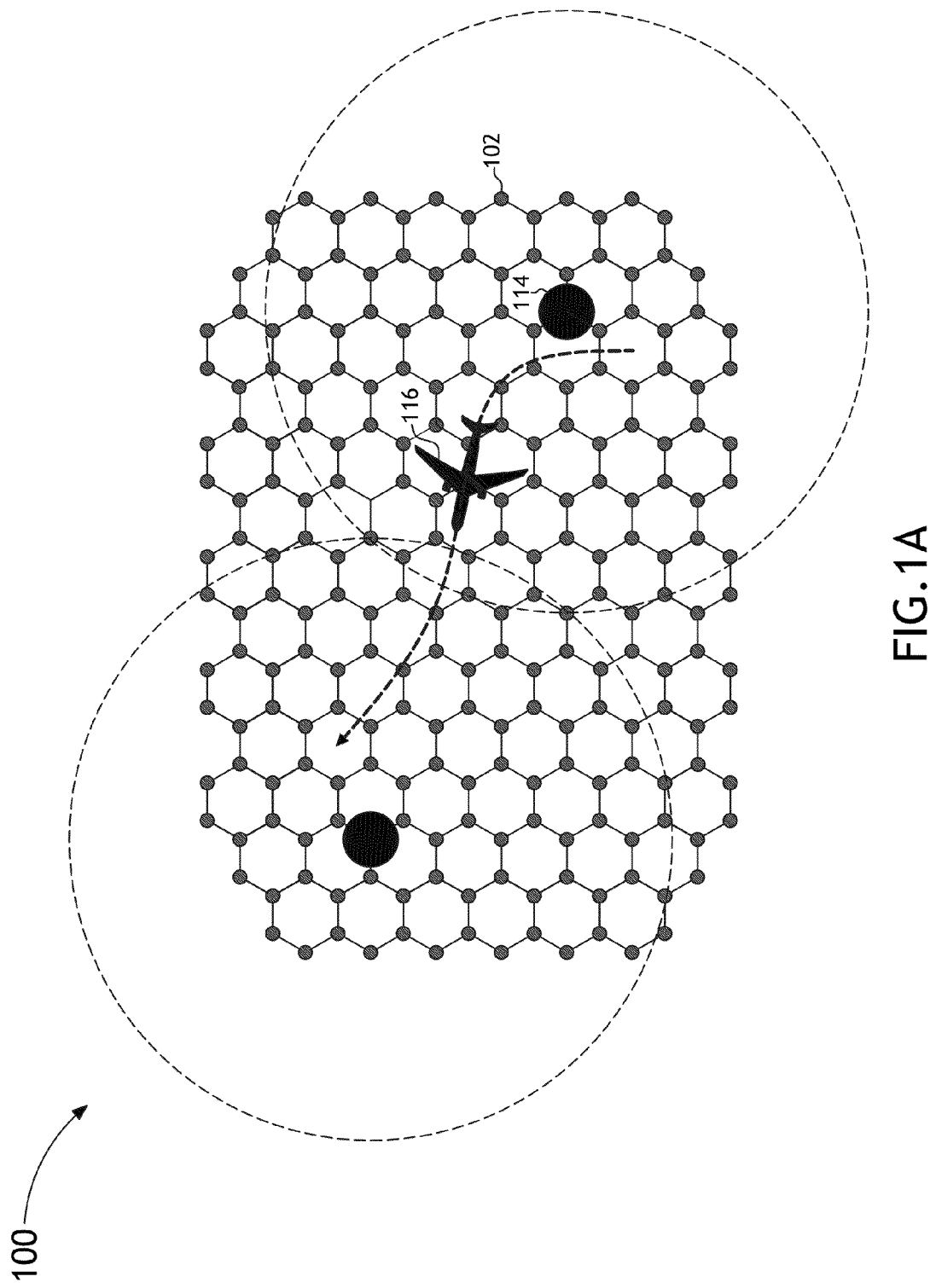
FIG. 1A is an conceptual aerial-view of a wireless communications network equipped with native cellular nodes and augmented cellular nodes, in accordance with one embodiment of the present invention.
Figure 1B:
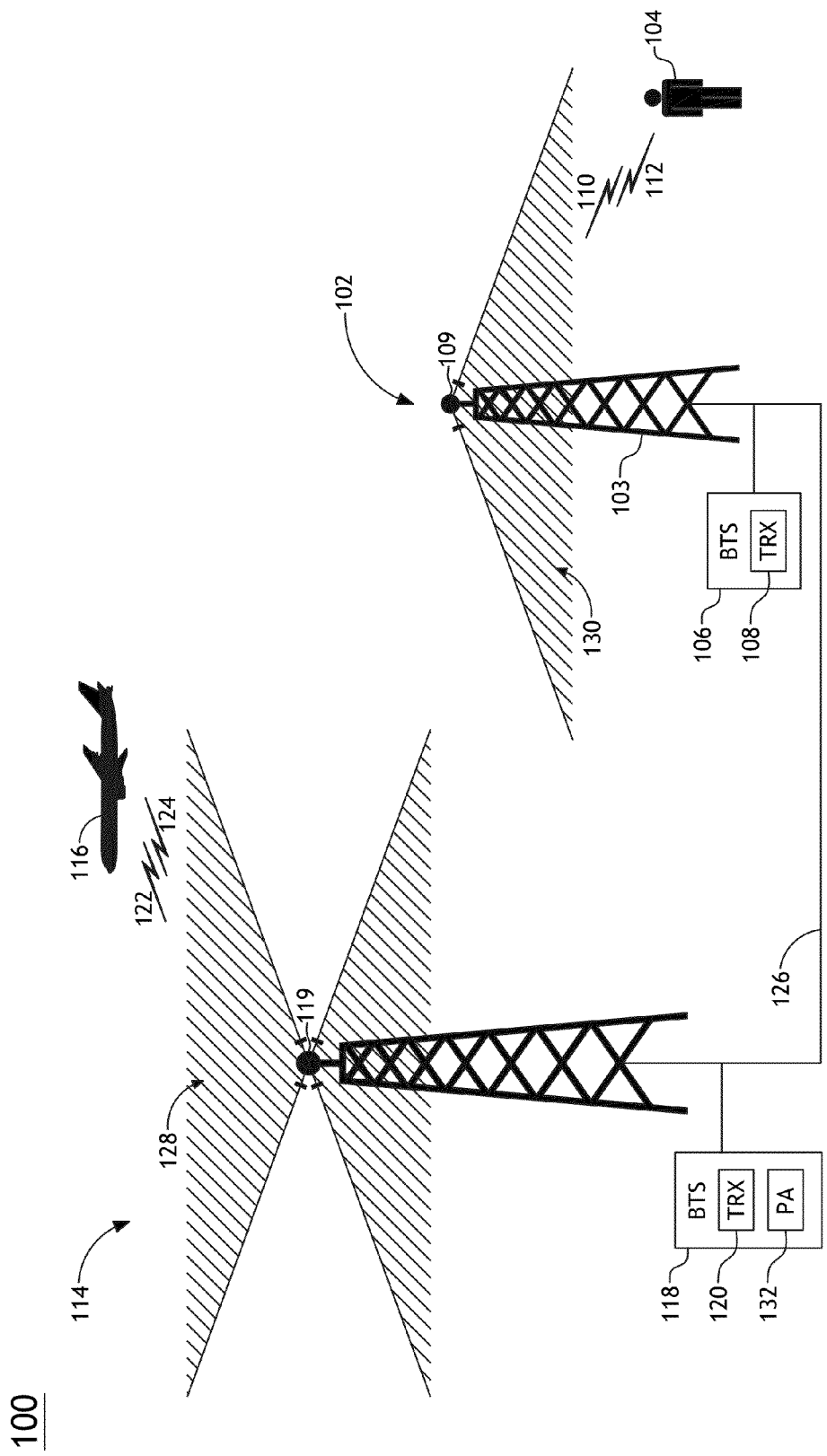
FIG. 1B is an conceptual side-view of a wireless communications network equipped with native cellular nodes and augmented cellular nodes, in accordance with one embodiment of the present invention.
Figure 1C:
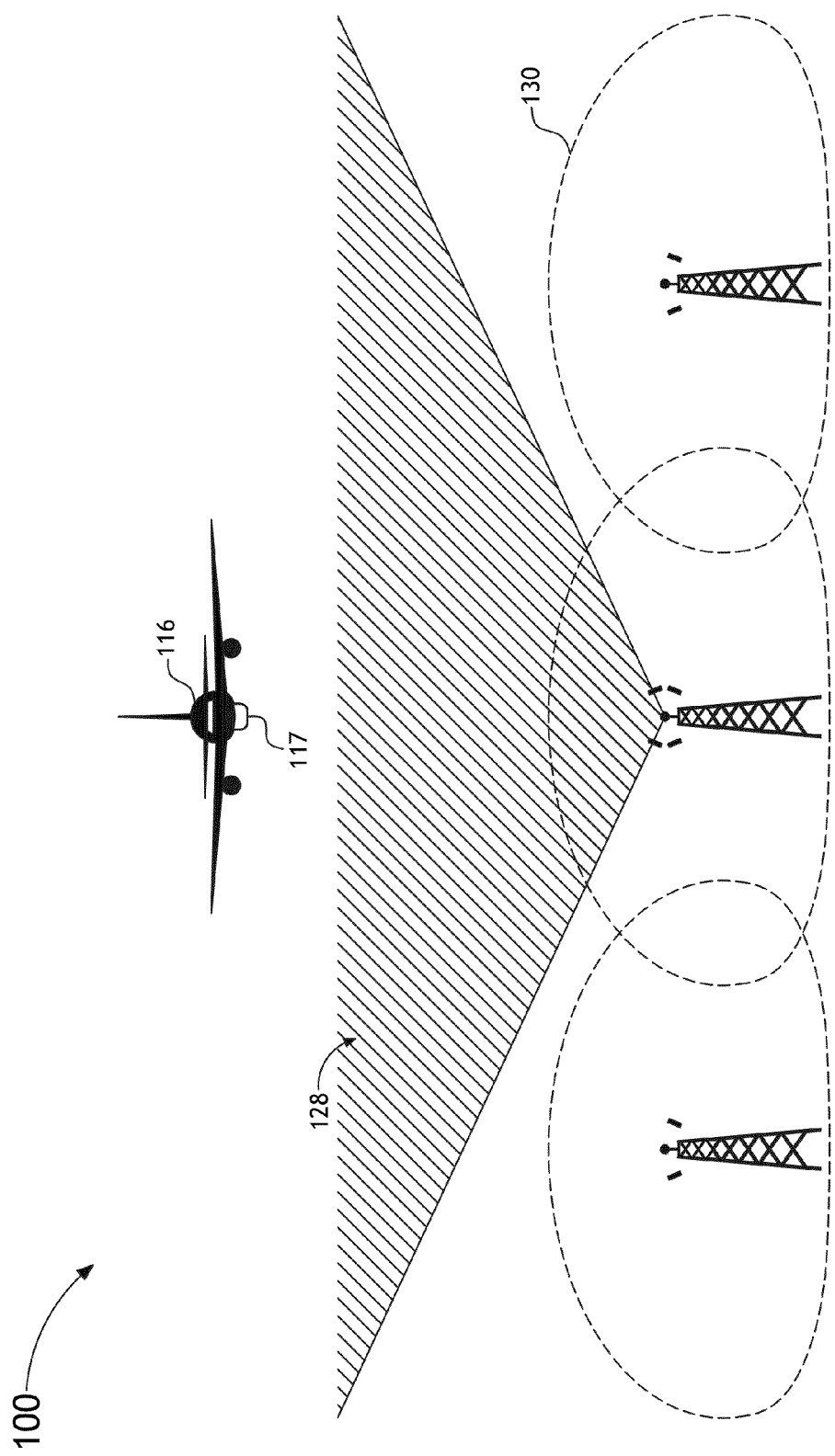
FIG. 1C is an additional conceptual side-view of a wireless communications network equipped with native cellular nodes and augmented cellular nodes, in accordance with one embodiment of the present invention.
Figure 2:
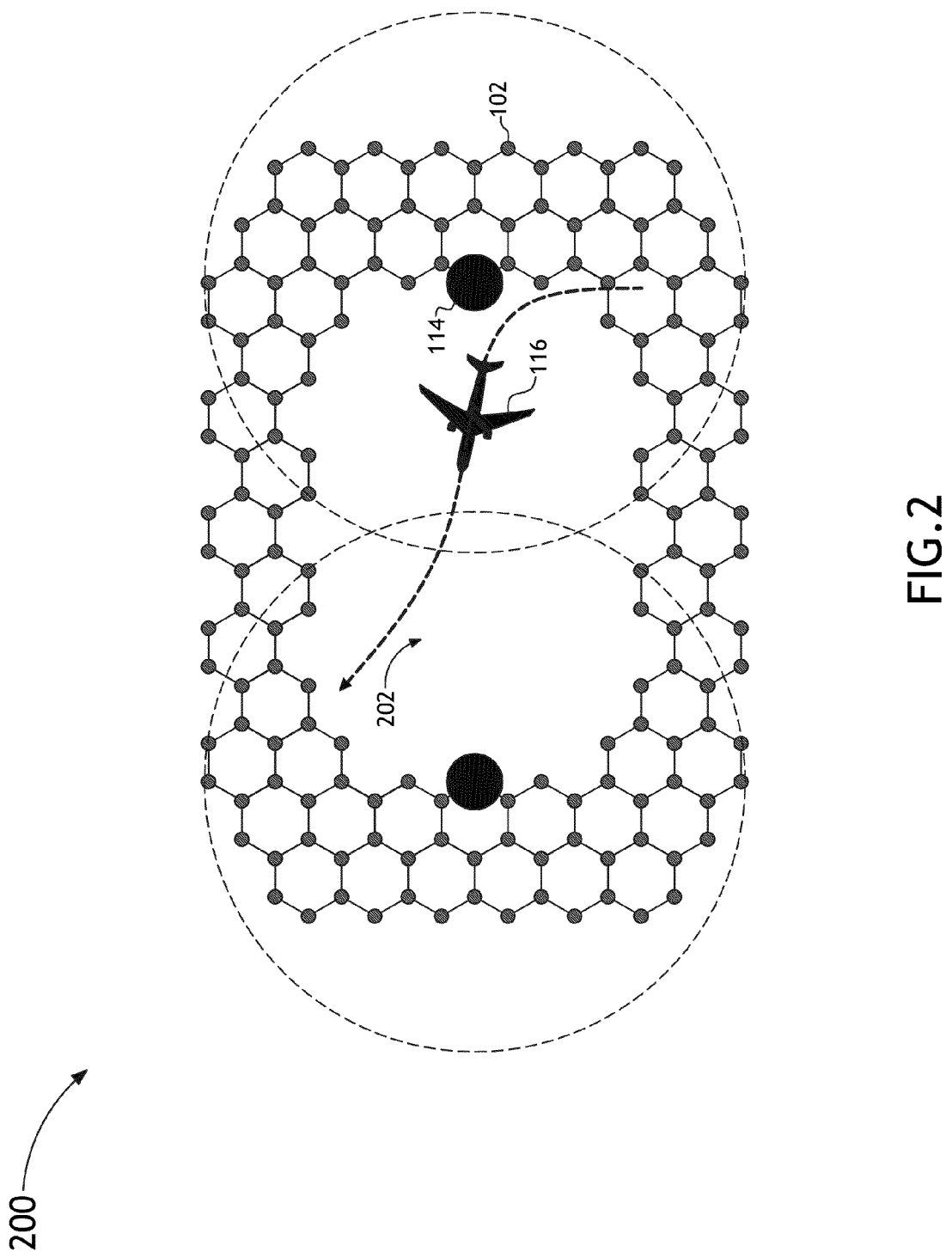
FIG. 2 is a conceptual aerial-view of a wireless communications network having a native signal "dead zone" and equipped with native cellular nodes and augmented cellular nodes, in accordance with one embodiment of the present invention.
Figure 3:
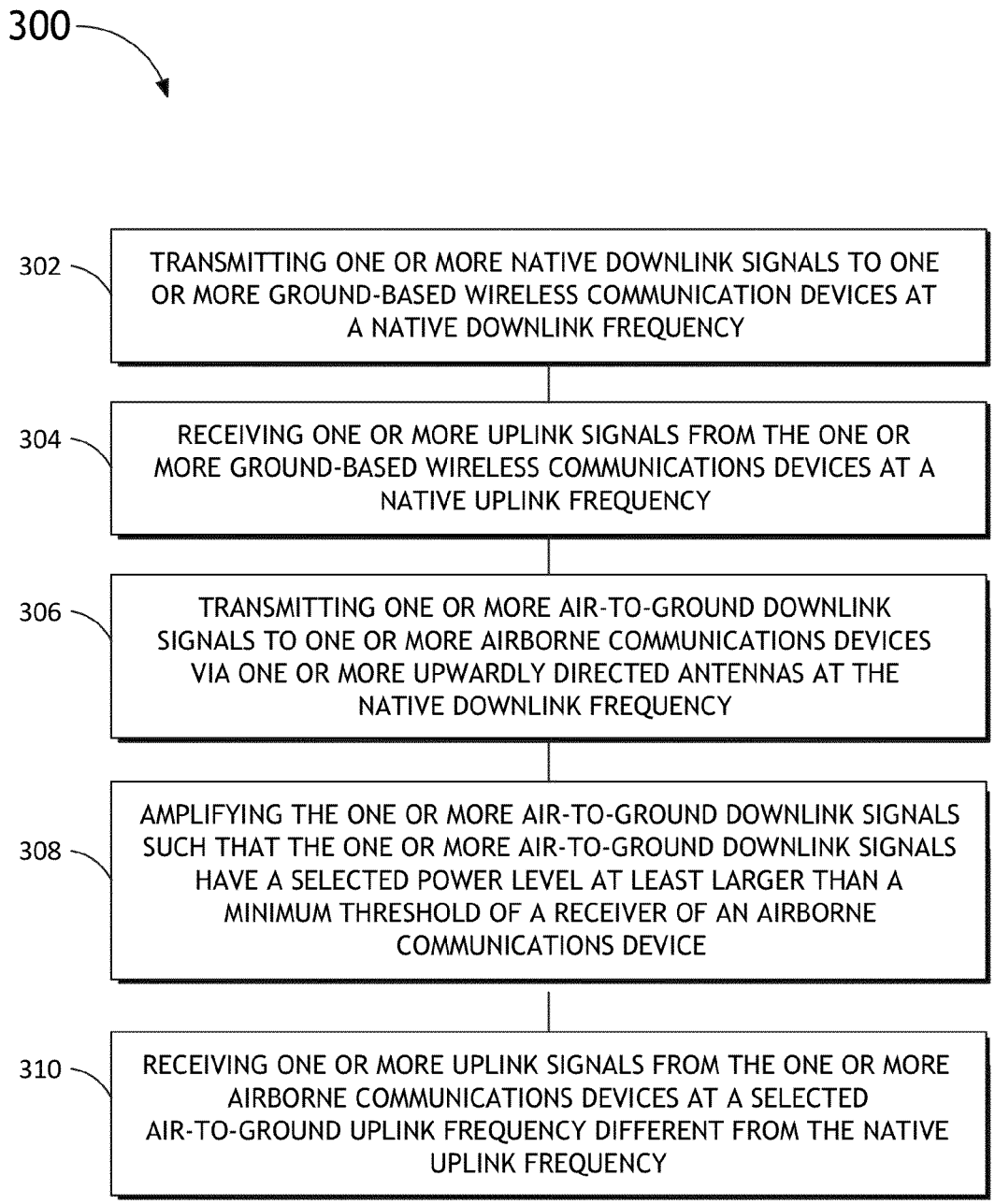
FIG. 3 is a flow diagram illustrating a method for providing air-to-ground connectivity on a terrestrial wireless communications network, in accordance with an alternative embodiment of the present invention.

Referring generally to FIG. 1 through 3, a wireless communications network 100 suitable for providing air-to-ground connectivity is described in accordance with present disclosure. The present invention is directed towards a system and method for providing air-to-ground connectivity between an airborne communication device and a ground-based cellular network. Due to the ubiquitous presence of cellular networks and the high cost of competing technologies, such as satellite-based communications systems, cellular networks having air-to-ground connectivity are particularly desirable. However, the implementation of airborne communications systems in a ground-based cellular network poses major obstacles. Due to the large line-of-sight of airborne communications devices, the transmission pattern associated with an airborne antenna (e.g., antenna mounted on aircraft) may extend far beyond the typical footprint associated with a ground-based antenna of equal transmission power, which is typically limited due to obstructing objects, topography, and the curvature of the Earth. As such, a transmission pattern associated with an airborne antenna may interact with numerous cellular nodes of a cellular network, making it very difficult to maintain a connection to a single network node. The extended uplink transmission of airborne antenna may act to overwhelm ground-based cellular nodes as well as generate increased interference with ground-based wireless devices. In addition, due to the high altitude of aircraft antenna and the fact that transmission patterns of typical cellular network nodes fail to extend significantly in an upward direction, aircraft communications systems may have difficulty in receiving downlink signals from existing cellular network infrastructure.

The present invention provides a system and method suitable for eliminating or mitigating the above deficiencies. In a first aspect, the wireless communications network suitable for providing air-to-ground connectivity of the present invention includes multiple augmented cellular nodes equipped, each equipped with an upward facing antenna, which acts to establish a skyward cellular sector of the network. The skyward cellular sector allows aircraft antenna to more easily receive downlink signals from a given ground-based network. The present invention further provides for power amplification of the skyward downlink signal, which even further enhances the spatial extent of the skyward downlink signal emanating from a given augmented node. In another aspect, the augmented nodes of the present invention may be configured to receive an uplink signal from an airborne antenna transmitted via a frequency band that is different from the standard uplink frequency band of the ground-based network. The aircraft specific uplink signal aids in avoiding interference with ground-based users as well as potential multi-node conflicts created by the large transmission pattern of the aircraft uplink signal. Additionally, the augment cellular nodes of the present invention are generally configured to share the backhaul infrastructure of existing standard nodes of the network. It is further noted that a given augmented cellular node of the present invention may be positioned on the same tower infrastructure as an existing standard node. The ability to share backhaul and communication infrastructure may provide significant cost-savings effects. The remainder of the present disclosure will discuss each of these features in detail.

FIGS. 1A-1C illustrate conceptual views of a network 100 suitable for providing air-to-ground connectivity, in accordance with one embodiment of the present invention. As shown in FIG. 1A, the network 100 may include a set of native cellular network nodes 102 configured to provide wireless communication connectivity to one or more ground-based wireless communication devices 104 (e.g., cellular phone, smart phone, portable hotspot, and the like). In one aspect, each native cellular node may include a base transceiver station (BTS) 106 equipped with one or more transceivers 108 configured to communicate with the ground-based communications devices 104 over a selected native frequency band (e.g., 700 Mhz band) via one or more antennas 109. In this regard, each BTS 104 of each native node 102 may be equipped with a transceiver or transmitter/receiver pair configured to receive an uplink signal 110 from the ground-based devices 104 at a selected native uplink frequency and transmit a signal 112 to the ground-based devices at a selected native downlink frequency. For example, the native nodes 104 of the communications network may be configured to provide 4G/LTE communication service to the ground-based communications devices 104. For instance, each native cellular node may be configured to transceive in the 700 Mhz band. In this regard, each native cellular node may be configured to receive an uplink signal at 776-787 Mhz and transmit a downlink signal at 746-757 Mhz. It is noted herein that the above cellular standard and frequency band is not limiting and should be interpreted merely as illustrative.

The network for providing air-to-ground connectivity 100 further includes a set of augmented nodes 114 configured to provide wireless communication connectivity to one or more airborne communication systems, such as a wireless communications device on an aircraft 116. In one aspect, each augmented cellular node 114 may include an augmented base transceiver station (BTS) 118 equipped with one or more transceivers 120 configured to communicate with one or more aircraft 116, over a selected frequency band (e.g., 700 Mhz band) via one or more upwardly facing antennas 119. In this regard, each augmented BTS 114 of each augmented node 114 is equipped with a transceiver or transmitter/receiver pair configured to receive an uplink signal 122 from a transceiver of an aircraft 116 at a selected air-to-ground uplink frequency and transmit a signal 124 to the aircraft at a selected downlink frequency (e.g., native downlink frequency or a frequency different from the native downlink frequency).

As shown in FIG. 1A, the aerial spacing of the augmented nodes 114 of the network 100 is generally much greater than the spacing of the native nodes 102 of the network 100. In this sense, while an augmented node 114 may be collocated on a common tower with a native node 102 of the network 100, it is anticipated that the augmented nodes 114 will only be positioned at select native node position. By reducing the aerial density of the augmented nodes 114 of the network 100, the likelihood of interference between two or more augmented nodes 114 is reduced. In a general sense, the spacing of augmented nodes throughout the geographic region of the network 100 may include a distance necessary to reduce interference between two or more augmented nodes at or below a selected level. For example, the augmented nodes 114 nodes may have a spatial spacing of approximately 100-200 miles. It is noted herein that this listed spacing is in no way limiting and is provided merely for purposes of illustration.

It is recognized herein that in the case of 4G LTE network, a LTE based signal is generally spread across multiple narrow frequency and time components. In this regard, a given device utilizing an LTE network may establish a signal via a first frequency, but then as the signal at that frequency fades in time, the device may then transition to a signal on a second frequency having superior signal quality. In this sense, an LTE user may be thought of as occupying a set of narrow frequency bands and time slots. This type of configuration is particularly useful in settings where numerous obstructions may be present (e.g., city). Obstructions, such as buildings, produce the potential for signal fading. In general, signal fading is frequency selective, so as a device loses signal as a result of obstruction-generated fading at one frequency, the device may pick up the link in another frequency not subject to the same fading effect. Applicant further notes, however, that, in the case of an airborne device utilizing a ground-based LTE system, the potential for obstruction-based fading is very small. As such, the frequency characteristics of an airborne LTE device will tend to behave similarly to a fixed system.

For the purposes of the present disclosure, the terms "native frequency," "air-to-ground frequency," "native frequency band," and "air-to-ground band," and the like are interpreted to encompass the frequency/time characteristics of a typical LTE system. In this sense, the term "frequency" as used in the claims and description of the present disclosure should not be interpreted to be limited to a singular frequency value fixed in time. Rather, the term "frequency" may extend to a set of frequencies, which change as a function of time. As such, in an LTE setting, a "native uplink frequency" being different from the "air-to-ground frequency," may be interpreted as "a set of narrow native frequency bands" being different from "a set of narrow air-to-ground frequency bands."

It is recognized herein that the augmentation of a native cellular network 100 allows for a common network backhaul 126 infrastructure to be used in the operation of the native network nodes 102 and the augmented network nodes 114. The sharing of backhaul infrastructure 126 provides an efficient solution to providing cellular connectivity to aircraft 116. In this regard, it is anticipated that the augmented nodes 114 of the network 100 may be connected to the backhaul infrastructure 126 that is used to operate the native nodes 102 of the network. It is recognized herein that the ability of the augmented nodes 114 of the present invention to share a preexisting backhaul infrastructure of a given network may provide significant cost-savings benefits.

In a general sense, the network 100 of the present invention may include any backhaul infrastructure known in the art. For example, in the case of 2G, 3G, 4G, WiMax and 5G cellular networks, the backhaul 126, or backbone, systems may consist of microwave-based coupling between the sub-networks (i.e., node-to-user) and the system backbone. In another example, the backhaul 126 systems may consist of wireline-based coupling between the sub-networks and the system backbone. Wireline-based backhaul infrastructures 126 may include, but are not limited to, a fiber optic-based backhaul, a wire-based (e.g., copper wire) backhaul, a cable-based backhaul, an Ethernet-based backhaul and the like. In addition, a 4G LTE based cellular network may utilize an "X2 protocol" utilized to interconnect two or more nodes of an implementing network.

In one embodiment of the present invention, at least some of the augmented nodes 114 of the network 100 may be located on a common tower with a native node 102 of the network 100.

In one embodiment, new augmented nodes 114 may be introduced into a preexisting network 100 at preselected geographical positions and coupled to the same backhaul 126 of the wireless network 100. In another instance, one or more preexisting standard nodes may be modified utilizing a "kit" to provide the features and functions described throughout the present disclosure. In yet another example, a new network may be built out with a portion of the nodes of the new network comprising "native nodes" configured to operate at standard specifications (i.e., specifications used in industry standard networks, such as 4G/LTE networks) and a portion of the nodes of the new network comprising "augmented nodes" configured to operate with the enhanced features and functions (e.g., upward facing antenna, uplink frequency different than standard uplink frequency, boosted downlink signal and the like) described throughout the present disclosure.

The native nodes 102 and the augmented nodes 114 of the network 100 may be configured to transmit and receive signals utilizing any cellular specification known in the art, such as, but not limited to, a LTE, WiMax, 5G, 4G, 3G, 2G, and the like. In a further aspect, the native nodes 102 and the augmented nodes 114 of the network 100 may be configured to transmit and receive on any frequency band known in the art. For example, at least one of the augmented nodes 114 or the native nodes 102 may transmit/receive on at least one of the Ku-band, the Ka-band, the K-band, the C-band (e.g., 700 Mhz band of the C-band), the L-band, the F-band, the X-band, and the UHF-band and the like.

In one embodiment, the air-to-ground uplink frequency of the air-to-ground uplink signal 122 may be different from the native uplink frequency of the native uplink signals 110 used to establish an uplink between the ground-based devices 104 and the native cellular nodes 102 of the network 100. For example, the native nodes 102 and augmented nodes 114 of the communications network may be configured to provide 4G/LTE communication service to the ground-based communications devices 104 using a standard 4G/LTE frequency band for the downlink. For instance, each native and augmented cellular node of the network 100 may be configured to transmit a downlink signal 124 at 746-757 Mhz. In contrast, the augmented nodes 114 of the network 100 may be configured to receive an uplink signal at a selected frequency different from a network standard uplink frequency of 776-787 Mhz. For example, the augmented nodes 114 of the network 100 may be configured to receive an uplink signal at approximately 800 Mhz. It is noted herein that the above listing of wireless regimes, bands, and frequencies is not limiting and should be interpreted as merely illustrative. In a general sense, any frequency and/or frequency band may be selected for the uplink signal of the augmented nodes 114 of the network 100 provided the selected frequency/band is sufficiently different from the native uplink frequency of the system 100 and other proximate wireless communication systems (e.g., nearby nodes of a different cellular network) in order to avoid appreciable interference.

It is recognized herein that the utilization of an uplink signal 122 for air-to-ground communication having a frequency different than the uplink signal 110 for ground-to-ground communication aids in eliminating interference between aircraft 116 mounted communications devices and ground-based communications devices 104. Due to the large line-of-sight of an airborne antenna (relative to a ground-based user), a transmission pattern of an airborne communications device 116 (e.g., antenna mounted on aircraft) may cover a much larger geographical area than the transmission pattern of a ground-based device 104. In addition, an airborne radio maintains line-of-sight connectivity to multiple connection nodes of the network 100 making it difficult to maintain a connection to a single node of the network 100. The utilization of a separate air-to-ground uplink frequency that is different from the standard uplink frequency used by ground-based antennas should aid in avoiding the issues described above. The particular value of the air-to-ground frequency may depend on a number of factors including, but not limited to, the native frequency band of the network 100 and the width of the native uplink frequency band. In a general sense, any frequency may be selected for a shifted air-to-ground uplink signal 122 provided the frequency sufficiently avoids the native uplink frequency band.

In an alternative embodiment, the air-to-ground uplink frequency of the air-to-ground uplink signal 122 may be the same or substantially similar to the native uplink frequency of the native uplink signals 110 between the ground-based devices 104 and the native cellular nodes 102 of the network 100.

In another aspect of the present invention, each of the air-to-ground nodes 114 of the network 100 includes one or more upwardly facing antennas 119 configured to transmit a downlink signal to an antenna of an aircraft 116. For example, each upwardly facing antenna 119 may be oriented at a selected upward angle generally above the horizon suitable for reducing interference between at least adjacent nodes below a selected level. In this regard, the upward facing antenna 119 of a given mode acts to generate a skyward cellular sector, as shown in FIGS. 1B and 1C.

For instance, each upwardly facing antenna 119 may be oriented at approximately 45° relative to the horizon. Applicant notes that this angle is not in any way limiting and is providing merely for illustrative purposes. In this regard, the upwardly facing antenna 119 of each air-to-ground node 114 is suitable for generating a generally upwardly directed RF beam 128. As shown in FIGS. 1B and 1C, the upward character of the air-to-ground downlink RF beam 128 provides better beam geometry relative to the generally horizontal or downward beams 130 associated with a standard (i.e., the native) cellular node 102 of the network 100. This improved geometry allows for better downlink connectivity between the air-to-ground nodes 114 and the antenna 117 of the aircraft 116. In this sense, the upward facing beam has a larger effective isotropically radiated power (EIRP) at the antenna 117 of the aircraft 116 than does a downlink beam emanating from a native node 102 of the network 100. As a result, the likelihood of the transceivers of the aircraft 116 experiencing conflict between multiple nodes of the network 100 is reduced. Moreover, the upwardly facing beam 128 of the air-to-ground nodes 114 of the network 100 is likely to cause little interference with the native downlinks 130 providing connectivity to ground-based devices 104.

In a further embodiment, the receiver of the communications device of the aircraft 116 may be desensitized to the native downlink signals 112 from the native nodes 102 of the network 100. In this regard, the communications device of the aircraft 116 may be configured to null or partially null the inbound signal from the native nodes 102 of the network 100. For example, the antennal 117 of the aircraft 116 may include a directional antenna suitable for pointing in a selected direction that acts to minimize the power level of a signal 112 received from the native nodes 102 of the network 100, while simultaneously maintaining the power level (at the antenna 117) of the downlink signal 124 from the air-to-ground nodes 114 above a selected power level. As a result, the antenna 117 tends to detect the air-to-ground downlink signals 124 from the air-to-ground nodes 114 due to the upward facing beams emanating from the upward facing antenna 119 of the air-to-ground nodes 114.

Air-to-ground directional antennas suitable for implementation in the present invention are described in detail in U.S. patent application Ser. No. 13/090,792, filed on Apr. 20, 2011, which is incorporated herein in their entirety.

In another embodiment, each air-to-ground node 114 of the network 100 may be equipped with a power amplifier (PA) configured to amplify the air-to-ground downlink signal 124 emanating from each of the air-to-ground nodes 114 to a selected power level at least larger than a minimum threshold of a receiver of an airborne communications device. In this regard, the amplified downlink signal 124 emanating from the air-to-ground nodes 114 will have a power level larger than the downlink signal 112 emanating from the native nodes 102 of the network 100 as measured at the antenna of the aircraft 116. In particular, the power amplifier may amplify the one or more augmented downlink signals 124 such that the augmented downlink signals 124 have a power level sufficient to the minimum threshold of the receiver of the communications device of the aircraft 116 need to achieve an adequate data transfer rate (e.g., highest data transfer rate). It is recognized herein that the power amplifier 132 may include any power amplifier known in the art of RF signal amplification. It is noted herein that the power level described above should be interpreted as the power level of the downlink signals as measured at the receiving circuitry of the aircraft 116. For instance, the power amplifier may be configured to amplify the air-to-ground signal 124 to a selected power level measured in terms of Effective Isotropic Radiated Power (EIRP) measured at the receiver of the aircraft 116.

It is recognized herein that it may be particularly advantageous to implement the desensitized communications device of the aircraft 116 in conjunction with the amplified air-to-ground down link signals 124. The combination of amplification by the power amplifier 132 and the desensitized communications device of the aircraft 116 described above allows for improved minimization of the relative contribution of the native downlink signals 112 to the transmissions received by the antenna 117 of the aircraft. In this regard, the power level of air-to-ground nodes 114 and the level of desensitization may be selected to increase the difference in relative power between the received air-to-ground downlink signal 124 and the native downlink signal 112 above a selected level. In this manner, the desensitized communications device of the aircraft 116 will tend to pick up primarily the amplified downlink beam 124 from the augmented nodes 114 of the network 100. This detected amplified downlink signal 124 is then demodulated by the receiving circuitry of the aircraft 116. Further, it is noted herein that the selected difference in power levels between the native downlink signals 112 and the air-to-ground downlink signals 124 may be chosen to ensure adequate deconfliction between the native nodes 102 and the augmented nodes 114 of the network 100.

In another embodiment, the communications system of the aircraft 116 may be equipped with switching circuitry (not shown) suitable to switch between a first transceiver configured to transmit an uplink signal at the air-to-ground frequency and at least a second transceiver configured to transmit an uplink signal at the native uplink frequency of the communication network. In this regard, the antenna 117 may be coupled to either the first transceiver or the second transceiver utilizing switching circuitry. For example, transmission configuration of the aircraft 116 may be dictated by a user selection. For instance, in response to a user selection of air-to-ground frequency transmission, the switching circuitry may couple the first transceiver to the antenna 117 thereby allowing the communications system of the aircraft 116 to transmit uplink signals at the selected air-to-ground frequency. In contrast, in response to a user selection of native frequency transmission, the switching circuitry may couple the second transceiver to the antenna 117 thereby allowing the communications system of the aircraft 116 to transmit uplink signals at the native frequency. By way of another example, the transmission configuration of the aircraft 116 may be dictated by a computer controller programmed to respond to a characteristic of the aircraft (e.g., altitude). For instance, in response to a measurement of the altitude (e.g., measurement from an additional sub-system of aircraft 116) of the aircraft above a pre-selected level (e.g., 2000 feet), the computer controller may direct the switching circuitry of the communications system to couple the first transceiver to the antenna 117 of the aircraft in order to provide uplink transmission at the selected air-to-ground frequency. In another instance, in response to a measurement of the altitude of the aircraft below a pre-selected level (e.g., 2000 feet), the computer controller may direct the switching circuitry of the communications system to couple the second transceiver to the antenna 117 of the aircraft in order to provide uplink transmission at the native frequency of the ground-based network 100. It is recognized herein that the switching circuitry utilized to switch the uplink transmission configuration of the aircraft 116 may include any switching circuitry known in the art of radio frequency transmission.

In a further embodiment, the antenna 117 of the aircraft 116 may include one or more directional antennas used to direct the uplink signal from the aircraft 116 to a selected augmented node 114 of the network 100. It is recognized that the implementation of a direction antenna may aid in reducing interference with the aggregate ground-based communication. Directional antennas utilized to avoid conflict with ground-based communication are described in detail in U.S. patent application Ser. No. 13/493,047, filed on Jun. 11, 2012, which is incorporated herein by reference in the entirety.

FIG. 2 illustrates the network 100, in accordance with one embodiment of the present invention. As shown in FIG. 2, one or more augmented nodes 114 may be positioned at the periphery of a geographic region 202 lacking connectivity (i.e., a "dead zone") via the native ground-based nodes 102 of the network 100. Placement of the augmented nodes 114 along a portion of the periphery of a dead zone 202 may allow the augmented nodes 114 to bridge the connectivity gap existing in region 202, thereby providing uninterrupted service to an aircraft 116 traveling over the region 202. It is noted herein that the dead-zones may include geographical regions spanning more than 100 miles in at least one direction. In one embodiment, native nodes 102 positioned at the edge of a given dead-zone 202 may be modified in order to include the various features of the augmented nodes 114, as discussed throughout the present disclosure. It is recognized herein that this solution provides a significant financial benefit as it allows for the extension of pre-existing networks in order to provide air-to-ground connectivity across wide regions (e.g., regions larger than 200 miles across) of land which otherwise would lack wireless connectivity capabilities. Moreover, this extension of capabilities is achievable utilizing a relatively small and financially efficient upgrade to preexisting cellular network infrastructure.

FIG. 3 illustrates a process flow 300 depicting a method for providing air-to-ground connectivity on a terrestrial wireless communications network. In step 302, one or more native downlink signals may be transmitted to one or more ground-based wireless communication devices at a native downlink frequency. For example, a downlink channel 112 (e.g., via 700 Mhz band) may be established between the native cellular node 102 and a mobile phone 104 located within the coverage area of that cellular node 102.

In step 304, one or more uplink signals may be received from the one or more ground-based wireless communications devices at a native uplink frequency. For example, an uplink channel 110 (e.g., via 700 Mhz band) may be established between the native cellular node 102 and the mobile phone 104 located within the coverage area of that cellular node 102.

In step 306, one or more air-to-ground downlink signals may be transmitted to one or more airborne communications devices via one or more upwardly directed antennas at the native downlink frequency. For example, an air-to-ground downlink channel 124 may be established between an augmented cellular node 114 and an airborne communications device (e.g., antenna 117 of aircraft 116) via an upwardly facing antenna 119 of the node 114.

In step 308, the one or more air-to-ground downlink signals may be amplified such that the one or more air-to-ground downlink signals have a selected power level larger than a power level of the one or more native downlink signals. For example, one or more air-to-ground downlink signals 124 may be amplified utilizing a power amplifier 132 of the BTS 118 of a given air-to-ground node 114.

In step 310, one or more uplink signals from the one or more airborne communications devices may be received at a selected air-to-ground uplink frequency different from the native uplink frequency. For example, an air-to-ground uplink channel 122 may be established between an airborne communications device 117 and an augmented cellular node 114 via an air-to-ground uplink frequency. In one embodiment, the air-to-ground uplink frequency may be different from the native uplink frequency of the network 100. In another embodiment, the air-to-ground uplink frequency may be substantially the same as a native uplink frequency of the network 100.

All of the system and methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Furthermore, it is to be understood that the invention is defined by the appended claims.

What is claimed:

1. A terrestrial communications network suitable for providing air-to-ground connectivity, comprising:
   a plurality of native cellular nodes configured to provide wireless communication connectivity to one or more ground-based wireless communication devices, each native cellular node including a base transceiver station (BTS) having one or more transceivers configured to transmit a downlink signal to the one or more ground-based wireless communication devices at a native downlink frequency and receive an uplink signal from the one or more ground-based wireless communications devices at a native uplink frequency; and
   a plurality of augmented cellular nodes configured to provide wireless communication connectivity to one or more airborne communications devices, each augmented cellular node including an augmented BTS having one or more transceivers configured to transmit a downlink signal to the one or more airborne communications devices via one or more upwardly directed antennas at the native downlink frequency and receive an air-to-ground uplink signal from the one or more airborne communications devices at a selected air-to-ground uplink frequency, wherein at least one of the augmented cellular nodes includes one or more power amplifiers configured to amplify the downlink signal transmitted by an upwardly directed antenna such that the downlink signal emanating from the at least one augmented cellular node has a power level larger than a downlink signal emanating from at least one of the native cellular nodes, wherein the plurality of native cellular nodes and the plurality of augmented cellular nodes are configured to operate on a common backhaul infrastructure.

2. The communications network of claim 1, wherein the air-to-ground uplink frequency is different from the native uplink frequency.

3. The communications network of claim 1, wherein the air-to-ground uplink frequency is substantially the same as the native uplink frequency.

4. The communications network of claim 1, wherein at least one of the plurality of native network cellular nodes and the plurality of augmented cellular nodes are configured to at least one of transmit and receive via at least one of the Ku-band, the Ka-band, the K-band, the C-band, the L-band, the F-band, the X-band, and the UHF-band.

5. The communications network of claim 1, wherein at least one of the plurality of native network cellular nodes and the plurality of augmented cellular nodes are compatible with at least one of an LTE specification, WiMax specification, 5G specification, 4G specification, 3G specification, and 2G specification.

6. The communications network of claim 1, wherein the one or more airborne communications devices comprise:
one or more aircraft mounted communication devices.

7. The communications network of claim 6, wherein the one or more aircraft mounted communication devices comprise:
one or more aircraft mounted communication devices including one or more transceivers configured to receive a downlink signal at the native downlink frequency and transmit an uplink signal at the selected air-to-ground uplink frequency.

8. The communications network of claim 6, wherein the one or more aircraft mounted communication devices comprise:
one or more aircraft mounted communication devices including switching circuitry configured to switch between a first transceiver configured to transmit an uplink signal at the air-to-ground frequency and a second transceiver configured to transmit an uplink signal at the native uplink frequency of the communication network.

9. The communications network of claim 8, wherein the one or more aircraft mounted communication devices including switching circuitry configured to switch between a first transceiver configured to transmit an uplink signal at the air-to-ground frequency and a second transceiver configured to transmit an uplink signal at the native uplink frequency of the communication network comprise:
one or more aircraft equipped with switching circuitry configured to switch between a first transceiver configured to transmit an uplink signal at the air-to-ground frequency and a second transceiver configured to transmit an uplink signal at the native uplink frequency of the communication network in response to a user input.

10. The communications network of claim 8, wherein the one or more aircraft mounted communication devices including switching circuitry configured to switch between a first transceiver configured to transmit an uplink signal at the air-to-ground frequency and a second transceiver configured to transmit an uplink signal at the native uplink frequency of the communication network comprise:
one or more aircraft equipped with switching circuitry configured to switch between a first transceiver configured to transmit an uplink signal at the air-to-ground frequency and a second transceiver configured to transmit an uplink signal at the native uplink frequency of the communication network in response to an altitude of the aircraft.

11. The communications network of claim 1, wherein the one or more airborne communications devices comprise:
an airborne communications device desensitized to the native downlink frequency of the communications network.

12. The communications network of claim 1, wherein each augmented cellular node comprises:
an augmented cellular node including one or more power amplifiers configured to transmit an augmented downlink signal having a selected power level at least larger than a minimum threshold of a receiver of an airborne communications device.

13. The communications network of claim 1, wherein at least one of the native cellular nodes and at least one of the augmented cellular nodes are disposed in a common tower structure.

14. The communications network of claim 1, wherein some of the plurality of augmented cellular nodes are arranged at a periphery of a geographic region devoid of connectivity via the plurality of native cellular nodes.

15. A wireless network communication node suitable for integration in a wireless communications network, comprising:
an augmented base transceiver station (BTS), the augmented BTS including one or more transceivers;
one or more upwardly oriented antennas communicatively coupled to the one or more transceivers, the one or more transceivers configured to transmit a downlink signal to one or more airborne communication devices via the one or more upwardly oriented antennas at a downlink frequency; and
one or more power amplifiers configured to amplify the downlink signal such that the downlink signal emanating from the one or more upwardly oriented antennas has a power level larger than a native downlink signal emanating from one or more antennas of at least one native cellular node,
the one or more transceivers further configured to receive an uplink signal from the one or more airborne communications devices via the one or more upwardly oriented antenna.

16. The wireless network node of claim 15, wherein the downlink signal has a downlink frequency substantially equal to a native downlink frequency of the wireless communications network.

17. The wireless network node of claim 15, wherein the downlink signal has a downlink frequency different from a native downlink frequency of the wireless communications network.

18. The wireless network node of claim 15, wherein the uplink signal from the one or more airborne communications devices is transmitted at a frequency different from the native uplink frequency.

19. The wireless network node of claim 15, wherein the uplink signal from the one or more airborne communications devices is transmitted at the native uplink frequency.

20. The communications network of claim 15, wherein the augmented BTS is configured to at least one of transmit and receive via at least one of the Ku-band, the Ka-band, the K-band, the C-band, the L-band, the F-band, the X-band, and the UHF-band.

21. The communications network of claim 15, wherein the augmented BTS is compatible with at least one of an LTE specification, WiMax specification, 5G specification, 4G specification, 3G specification, and 2G specification.

22. A method for providing air-to-ground connectivity on a terrestrial wireless communications network, comprising:
transmitting one or more native downlink signals to one or more ground-based wireless communication devices at a native downlink frequency;
receiving one or more uplink signals from the one or more ground-based wireless communications devices at a native uplink frequency;
transmitting one or more air-to-ground downlink signals to one or more airborne communications devices via one or more upwardly directed antennas at the native downlink frequency;
amplifying the one or more air-to-ground downlink signals such that the one or more air-to-ground downlink signals have a power level larger than the one or more native downlink signals transmitted to one or more ground-based wireless communication devices; and receiving one or more uplink signals from the one or more airborne communications devices at a selected air-to-ground uplink frequency different from the native uplink frequency.

* * * * *